(12) United States Patent
Ishii et al.

(10) Patent No.: US 10,670,074 B2
(45) Date of Patent: Jun. 2, 2020

(54) METHOD FOR PRODUCING SEMISPHERICAL SHOE FOR SWASH PLATE COMPRESSOR AND INJECTION MOLDING DIE

(71) Applicant: NTN CORPORATION, Osaka (JP)

(72) Inventors: Takuya Ishii, Mie (JP); Satoru Fukuzawa, Mie (JP); Hirohisa Abe, Mie (JP); Akihiro Oomori, Mie (JP)

(73) Assignee: NTN CORPORATION, Osaka (JP)

(*) Notice: Subject to any disclaimer, the term of this patent is extended or adjusted under 35 U.S.C. 154(b) by 375 days.

(21) Appl. No.: 15/505,884

(22) PCT Filed: Aug. 21, 2015

(86) PCT No.: PCT/JP2015/073459
§ 371 (c)(1),
(2) Date: Feb. 22, 2017

(87) PCT Pub. No.: WO2016/027876
PCT Pub. Date: Feb. 25, 2016

(65) Prior Publication Data
US 2017/0276175 A1 Sep. 28, 2017

(30) Foreign Application Priority Data

Aug. 22, 2014 (JP) ................ 2014-169745
Oct. 2, 2014 (JP) ................ 2014-203591

(51) Int. Cl.
*F16C 29/02* (2006.01)
*F04B 27/12* (2006.01)
(Continued)

(52) U.S. Cl.
CPC .............. *F16C 29/02* (2013.01); *B29C 44/42* (2013.01); *B29C 45/0001* (2013.01);
(Continued)

(58) Field of Classification Search
CPC .... F16C 29/02; F16C 33/201; F04B 27/0886; F04B 27/1072; F04B 27/1081;
(Continued)

(56) References Cited

U.S. PATENT DOCUMENTS 4,512,175 A 4/1985 Kaku
6,183,235 B1 * 2/2001 Taniguchi ............... B29C 45/38
425/139

(Continued)

FOREIGN PATENT DOCUMENTS

CN 2924064 Y 7/2007
CN 102575659 A 7/2012
(Continued)

OTHER PUBLICATIONS

Supplementary European Search Report dated Feb. 8, 2018.
(Continued)

*Primary Examiner* — Michael M. Robinson
(74) *Attorney, Agent, or Firm* — Hedman & Costigan, P.C.; James V. Costigan; Kathleen A. Costigan

(57) ABSTRACT

The present invention provides a method for producing a durable semispherical shoe which can be prevented from being subjected to seizure even in a dry lubrication state in which there is no lubricating oil at a start time of an operation of a swash plate compressor, can be restrained from deteriorating in its lubricating property due to generated frictional heat, and can be restrained from deteriorating in its strength at a production time and an injection molding die. A semispherical shoe (4), for a swash plate compressor, to be produced by the production method has a base material (5), consisting of a hard material, which has a hollow part along a central axis thereof and a resin layer, consisting of a resin composition, which is formed on a surface of a planar part, disposed on a periphery of the base member, which is (Continued)

to be subjected to sliding contact with the swash plate and on a surface of a spherical part, disposed on the periphery thereof, which is to be subjected to sliding contact with a piston. A resin-filled portion (8) where the resin composition is filled and an empty portion where the resin composition is not filled are formed in the hollow part of the base material. The resin-filled portion (8) and the resin layer are formed by injecting and filling the resin composition into a portion to be formed as the resin-filled portion (8) with the base material (5) being disposed inside a cavity (22) of the injection molding die.

6 Claims, 4 Drawing Sheets

(51) Int. Cl.
| | |
|---|---|
| *F04B 27/10* | (2006.01) |
| *B29C 44/42* | (2006.01) |
| *B29C 45/00* | (2006.01) |
| *B29C 45/17* | (2006.01) |
| *B29C 45/56* | (2006.01) |
| *F04B 27/08* | (2006.01) |
| *F16C 33/20* | (2006.01) |
| *B29K 101/10* | (2006.01) |

(52) U.S. Cl.
CPC ........ *B29C 45/1703* (2013.01); *B29C 45/561* (2013.01); *F04B 27/0886* (2013.01); *F04B 27/1054* (2013.01); *F04B 27/1072* (2013.01); *F04B 27/1081* (2013.01); *F04B 27/12* (2013.01); *F16C 33/201* (2013.01); *B29K 2101/10* (2013.01); *F05C 2225/12* (2013.01); *F05C 2251/14* (2013.01); *F05C 2253/12* (2013.01); *F05C 2253/20* (2013.01)

(58) Field of Classification Search
CPC .... F04B 27/1054; F04B 27/12; B29C 45/561; B29C 45/1703; B29C 44/42; B29K 2101/10; F05C 2253/12; F05C 2253/20; F05C 2225/12; F05C 2251/14
See application file for complete search history.

(56) References Cited

U.S. PATENT DOCUMENTS

| | | |
|---|---|---|
| 2003/0000379 A1 | 1/2003 | Sugiura |
| 2003/0066419 A1 | 4/2003 | Kato |
| 2008/0248269 A1 | 10/2008 | Shibuya |

FOREIGN PATENT DOCUMENTS

| | | | | |
|---|---|---|---|---|
| EP | 1785627 A1 | | 5/2007 | |
| JP | S61-201782 A | | 9/1986 | |
| JP | 2002-039058 A | | 2/2002 | |
| JP | 2002-039062 A | | 2/2002 | |
| JP | 2002-180964 A | | 6/2002 | |
| JP | 2003-049766 A | | 2/2003 | |
| JP | 2003-120522 A | | 4/2003 | |
| JP | 2005-090385 A | | 4/2005 | |
| JP | 2005090385 A | * | 4/2005 | .......... F04B 27/0886 |
| JP | 2006-045493 A | | 2/2006 | |
| JP | 2006-266102 A | | 10/2006 | |
| JP | 2006266102 A | * | 10/2006 | |
| JP | 2007-051569 A | | 3/2007 | |
| JP | 2008-138545 A | | 6/2008 | |
| JP | 2008-215176 A | | 9/2008 | |
| JP | 2008215176 A | * | 9/2008 | |
| JP | 2009-257230 A | | 11/2009 | |
| JP | 2010-037991 A | | 2/2010 | |
| JP | 2013-204463 A | | 10/2013 | |
| WO | 2005/028864 A1 | | 3/2005 | |
| WO | 2006/006697 A1 | | 1/2006 | |
| WO | 2013/022094 A1 | | 2/2013 | |

OTHER PUBLICATIONS

English Abstract for JP 2008-215176 A dated Sep. 18, 2008.
English Abstract for JP 2008-138545 A dated Jun. 19, 2008.
English Abstract for JP 2006-266102 A dated Oct. 5, 2006.
English Abstract for JP S61-201782 A dated Sep. 6, 1986.
International Search Report for PCT/JP2015/073459 dated Oct. 20, 2015.
English Abstract for CN 102575659 A dated Jul. 11, 2012.
English Abstract for JP 2002-039058 A dated Feb. 6, 2002.
English Abstract for JP 2010-037991 A dated Feb. 18, 2010.
English Abstract for CN 2924064 Y dated Jul. 18, 2007.

\* cited by examiner

METHOD FOR PRODUCING SEMISPHERICAL SHOE FOR SWASH PLATE COMPRESSOR AND INJECTION MOLDING DIE

TECHNICAL FIELD

The present invention relates to a method for producing a semispherical shoe for a swash plate compressor for use in an air conditioner of a car and the like. The semispherical shoe is interposed between a swash plate and a piston to convert a rotational motion of the swash plate into a reciprocating motion of the piston. The present invention also relates to an injection molding die for use in the method for producing the semispherical shoe.

BACKGROUND ART

The swash plate compressor is so constructed that inside a housing where a refrigerant is present, a rotational motion of a swash plate mounted perpendicularly and obliquely on a rotational shaft by directly fixing the swash plate to the rotational shaft or indirectly fixing the swash plate thereto through a coupling member is converted into a reciprocating motion of a piston through a semispherical shoe to be subjected to sliding contact with the swash plate to compress and expand the refrigerant. The swash plate compressor is classified into a double swash plate type of compressing and expanding the refrigerant at both sides of the swash plate by using a double head type piston and a single swash plate type of compressing and expanding the refrigerant at one side thereof by using a single head type piston. The semispherical shoe includes a type which slides on only one side surface of the swash plate and a type which slides on both side surfaces thereof. In these swash plate compressors, sliding having a high relative speed of not less 20 m is generated per second on a sliding contact surface of the swash plate and that of the semispherical shoe. Thus the semispherical shoe is used in a very harsh environment.

In lubrication, lubricating oil circulates inside the housing, with the lubricating oil being blended into the refrigerant and diluted and is supplied to sliding contact portions in the form of mist. When an operation is resumed in an operation-suspended state, the lubricating oil is washed away by the vaporized refrigerant. As a result, when the operation is resumed, the sliding contact surface of the swash plate and that of the semispherical shoe have a dry lubricated state in which the lubricating oil is not supplied thereto. As a result, the sliding contact surfaces thereof are liable to be subjected to seizure.

As means for preventing sliding contact surface of the swash plate and that of the semispherical shoe from being subjected to the seizure, there is proposed the resin film, consisting of polyether ether ketone (PEEK), which is directly formed on at least the sliding contact surface of the swash plate and that of the semispherical shoe by using an electrostatic powder coating method (see patent document 1). There is also proposed the thermoplastic polyimide film, containing the solid lubricant, which is formed on the sliding contact surface thereof by using the electrostatic powder coating method (see patent document 2).

To secure a high sliding contact property in a high speed and high temperature condition, there is proposed the semispherical shoe for the swash plate compressor in which the sliding contact layer composed of the binder consisting of the PEEK resin and the solid lubricant dispersed in the binder is formed on the sliding contact portion of at least one of the swash plate, the semispherical shoe, and the piston (see patent document 3).

PRIOR ART DOCUMENTS

Patent Documents

Patent document 1: Japanese Patent Application Laid-Open Publication No. 2002-180964
Patent document 2: Japanese Patent Application Laid-Open Publication No. 2003-049766
Patent document 3: Japanese Patent Application Laid-Open Publication No. 2002-039062

SUMMARY OF THE INVENTION

Problem to be Solved by the Invention

In the conventional arts, to improve the lubrication property of the swash plate and that of the semispherical shoe, methods of composing the sliding contact surface of the swash plate and that of the semispherical shoe of the lubricating film have been proposed. Although the sliding contact surface of the swash plate is formed of the lubricating film, the sliding contact surface of the semispherical shoe has never been formed of the lubricating film. As the reason for this, the sliding contact area of the semispherical shoe is smaller than that of the swash plate and in addition, the semispherical shoe is subjected to sliding contact with the spherical seat of the piston. Thus it is presumed that the durability of the lubricating film forming the sliding contact surface of the semispherical shoe cannot be sufficiently obtained owing to generated frictional heat.

In the case where the entire surface of the semispherical shoe is covered with the resin film to allow the semispherical shoe to be subjected to the sliding contact with the swash plate and the piston, as conventionally done, the semispherical shoe has low performance in dissipating the generated frictional heat. Thus the temperature of the base material thereof rises. As a result, it may occur that the resin film melts. The formation of the resin film on the sliding contact surface of the semispherical shoe by using the electrostatic powder coating method or the application of a coating liquid subjects the semispherical shoe to a firing temperature. Thus there is a concern that the strength of the semispherical shoe deteriorates.

The swash plate having the lubricating film forming its sliding contact surface is demanded to have strict processing accuracy in terms of the flatness, parallelism, and thickness of the sliding contact surface thereof. In addition, the swash plate cannot be produced at a low cost because the area of the lubricating film composed of an expensive material is large.

The present invention has been made to deal with the above-described problems. Therefore it is an object of the present invention to provide a method for producing a durable semispherical shoe which can be prevented from being subjected to seizure even in a dry lubrication state in which there is no lubricating oil at a start time of an operation of a swash plate compressor, can be restrained from deteriorating in its lubricating property due to generated frictional heat, and can be restrained from deteriorating in its strength at a production time and provide an injection molding die.

Means for Solving the Problem

In a method of the present invention for producing a semispherical shoe for a swash plate compressor, the swash plate compressor is so constructed that inside a housing where a refrigerant is present, a rotational motion of a swash plate mounted perpendicularly and obliquely on a rotational shaft by directly fixing the swash plate thereto or indirectly fixing the swash plate thereto through a coupling member to the rotational shaft is converted into a reciprocating motion of a piston through a semispherical shoe to be subjected to sliding contact with the swash plate to compress and expand the refrigerant. The semispherical shoe has a base material, consisting of a hard material, which has a hollow part along a central axis thereof and a resin layer, consisting of a resin composition, which is formed on a surface of a planar part, disposed on a periphery of the base member, which is to be subjected to sliding contact with the swash plate and on a surface of a spherical part, disposed on the periphery thereof, which is to be subjected to sliding contact with the piston. A resin-filled portion where the resin composition is filled and an empty portion where the resin composition is not filled are formed in the hollow part of the base material. The resin-filled portion and the resin layer are formed by injecting and filling the resin composition into a portion to be formed as the resin-filled portion with the base material being disposed inside a cavity of the molding die.

The hollow part of the base material is cylindrical and spatial. A large diameter hollow portion having a diameter larger than those of other portions of the hollow part is formed at an end of a resin-filled portion side of the hollow part.

The resin composition is injected and filled into the molding die by fitting a core pin of the molding die on a portion to be formed as the empty portion of the hollow part of the base material with the base material being placed in position inside the cavity of the molding die.

A gate for injecting and filling the resin composition into the molding die is positioned at a planar part side of the semispherical shoe. The gate is a pin point gate.

A length of the resin-filled portion is ¼ to ¾ of an axial length of the hollow part.

An injection molding die of the present invention for a semispherical shoe for a swash plate compressor is used in the production method of the present invention. The injection molding die has a movable-side die plate and a fixed-side die plate. One of the movable-side die plate and the fixed-side die plate has a concave spherical surface, for forming the spherical part, which constitutes a part of the cavity and a core pin, disposed on a horizontal central axis of the cavity, which fits on the hollow part of the base material. Other of the movable-side die plate and the fixed-side die plate has a concave planar surface, for forming the planar part, which constitutes a part of the cavity, and a gate, for injecting and filling the resin composition into the injection molding die, which is disposed coaxially with the core pin.

The core pin has a small diameter stepped portion at a front end thereof. A stepped surface of the small diameter stepped portion butts against an end surface of the base material with the core pin fitting on the hollow part of the base material.

The movable-side die plate has the core pin capable of advancing as an ejection pin after the injection molding die is opened.

An opening of the gate of the die is disposed at a position recessed from a sliding contact surface of the semispherical shoe.

Effect of the Invention

The semispherical shoe to be obtained by carrying out the method of the present invention for producing the semispherical shoe for the swash plate compressor has the base material consisting of the hard material and the resin layer formed on the surface of the planar part, disposed on the periphery of the base member, which is to be subjected to sliding contact with the swash plate and on the surface of the spherical part, disposed on the periphery thereof, which is to be subjected to the sliding contact with the piston. Therefore the semispherical shoe can be prevented from being subjected to seizure even in a dry lubrication state in which there is no lubricating oil at a start time of an operation of the swash plate compressor. The resin-filled portion where the resin composition is filled and the empty portion where the resin composition is not filled are formed in the hollow part of the base material. Therefore it is possible to dissipate generated frictional heat from the empty portion and thus prevent the resin layer from melting due to the rise of the temperature of the base material.

In the production method of the present invention, the injection molding is adopted to form the resin layer. Thus it is unnecessary for subjecting the semi spherical shoe to a firing temperature at a production time and thus there in no concern about the deterioration of the strength of the resin layer. In an injection molding operation, a pressure is applied to the resin composition when it is in a molten state. Thus the resin layer is formed densely and excellent in its load resistance. Because the resin composition is injected and filled into the portion to be formed as the resin-filled portion with the base material being disposed inside the cavity of the molding die, the resin-filled portion and the resin layer are integrally formed. Further the resin layer is capable of uniformly covering the surface of the base material. Therefore it is possible to prevent the sliding contact property of the resin layer from becoming nonuniform with respect to the sliding contact surface thereof and the strength of adhesion of the resin layer to the base material from becoming nonuniform. Thereby it is possible to prevent the resin layer from peeling off the base material due to the sliding contact between the resin layer and the swash plate as well as the piston.

The hollow part of the base material is cylindrical and spatial. The large diameter hollow portion having a diameter larger than those of other portions of the hollow part of the base material is formed at the end of the resin-filled portion side of the hollow part. Therefore it is possible to set the diameter of the gate large and allow the flowability of the molten resin injected from the gate to be easily secured. Therefore although the resin layer is thinly formed, it is possible to prevent defects such as a short shot from occurring in the injection molding and to uniformly form the resin layer capable of adhering to the surface of the base material in a high adhesive strength.

The resin composition is injected and filled into the molding die by fitting the core pin of the molding die on the portion to be formed as the empty portion of the hollow part of the base material with the base material being placed in position inside the cavity of the molding die. Therefore it is possible to easily and accurately place the base material having the spherical surface in position inside the injection molding die.

The gate for injecting and filling the resin composition into the molding die is positioned at the planar part side of the semispherical shoe. Thereby the molten resin flows from the planar part to the spherical part. Considering that the highest load is applied to the planar part, the resin layer is formed on the planar part thinly enough to withstand a high surface pressure. Because the gate is a pin point gate, gate cut (in-mold gate cut) can be accomplished in an injection molding process. Thus unlike post-processing to be performed by using a hand tool such as a nipper, it is possible to prevent the surface of the resin layer from being damaged.

Because the length of the resin-filled portion is ¼ to ¾ of the axial length of the hollow part, the resin-filled portion plays the role of a cold slug well and is thus capable of preventing cold slug from being generated in the resin layer.

The injection molding die of the present invention for producing the semispherical shoe for the swash plate compressor has the movable-side die plate and the fixed-side die plate. One of the movable-side die plate and the fixed-side die plate has the concave spherical surface, for forming the spherical part, which constitutes a part of the cavity and the core pin, disposed along the horizontal central axis of the cavity, which fits on the hollow part of the base material of the semispherical shoe. The other of the movable-side die plate and the fixed-side die plate has the concave planar surface, for forming the planar part, which constitutes a part of the cavity and the gate disposed coaxially with the core pin. In this construction, the molten resin injected from the gate collides with the front end of the core pin and thereafter flows from the central axis of the semispherical shoe with the molten resin uniformly coating the surface of the base material. Consequently the resin layer formed on the surface of each of the spherical part and the planar part is uniform and does not have welds.

The core pin has the small diameter stepped portion at the front end thereof. The stepped surface of the small diameter stepped portion butts against the end surface of the base material with the core pin fitting on the hollow part of the base material of the semispherical shoe. Therefore the base material is axially placed in position inside the cavity. That is, it is possible to easily and accurately place the base material of the semispherical shoe having the spherical surface in position inside the cavity. The axial surface of the base material which contacts the small diameter stepped portion of the core pin is formed as the exposed surface where the resin layer is not formed when the production of the semispherical shoe is completed. Thus generated heat is dissipated from the exposed surface.

The movable-side die plate has the core pin capable of advancing as the ejection pin after the molding die is opened. Therefore it is unnecessary for proving the molding die with the ejection pin separately and in addition, a pin mark does not remain on the resin layer of the semispherical shoe.

The opening of the gate is disposed at the position recessed from the sliding contact surface of the semispherical shoe. Therefore it is possible to prevent a gate mark from projecting from the sliding contact surface (surface of resin layer) of the semispherical shoe.

MODE FOR CARRYING OUT THE INVENTION

Figure 1:
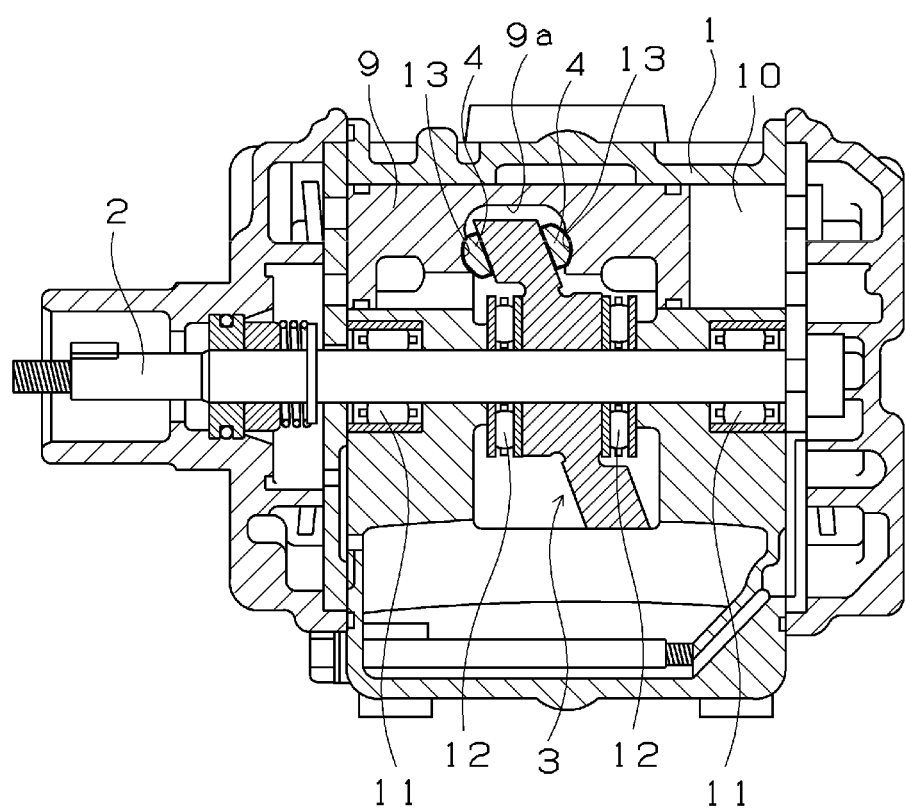
FIG. 1 is a vertical sectional view showing one example of a swash plate compressor using a semispherical shoe to be obtained by the production method of the present invention.

One example of a swash plate compressor using a semispherical shoe, for the swash plate compressor, to be obtained by carrying out the production method of the present invention is described below with reference to the drawings. FIG. 1 is a vertical sectional view showing the swash plate compressor. The swash plate compressor shown in FIG. 1 uses carbon dioxide as a refrigerant and is of a double swash plate type so constructed that inside a housing 1 where the refrigerant is present, a rotational motion of a swash plate 3 mounted obliquely on a rotational shaft 2 by directly fixing the swash plate 3 thereto is converted into a reciprocating motion of double-headed type pistons 9 through a semispherical shoe 4 to be subjected to sliding contact with both side surfaces of the swash plate 3 to compress and expand the refrigerant at both sides of each of the double-headed type pistons 9 disposed inside cylinder bores 10 formed at regular intervals in the circumferential direction of the housing 1. The rotational shaft 2 to be driven at a high speed is supported by a needle roller bearing 11 in its radial direction and by a thrust needle roller bearing 12 in its thrust direction. The swash plate 3 may be indirectly fixed to the rotational shaft 2 via a coupling member. The swash plate may also be mounted on the rotational shaft not obliquely but perpendicularly thereto.

A concave portion 9a is formed on each piston 9 in such a way that the concave portion strides over an outer peripheral portion of the swash plate 3. The semispherical shoe 4 is seated on a spherical seat 13 formed on a surface axially opposed to the concave portion 9a and supports the pistons 9 movably relative to the rotation of the swash plate 3. Thereby the rotational motion of the swash plate 3 can be smoothly converted into the reciprocating motions of the pistons 9. A spherical part of the semispherical shoe 4 is subjected to sliding contact with the pistons 9 (spherical seat 13), while a planar part of the semispherical shoe is subjected to sliding contact with the swash plate 3.

Figure 2:
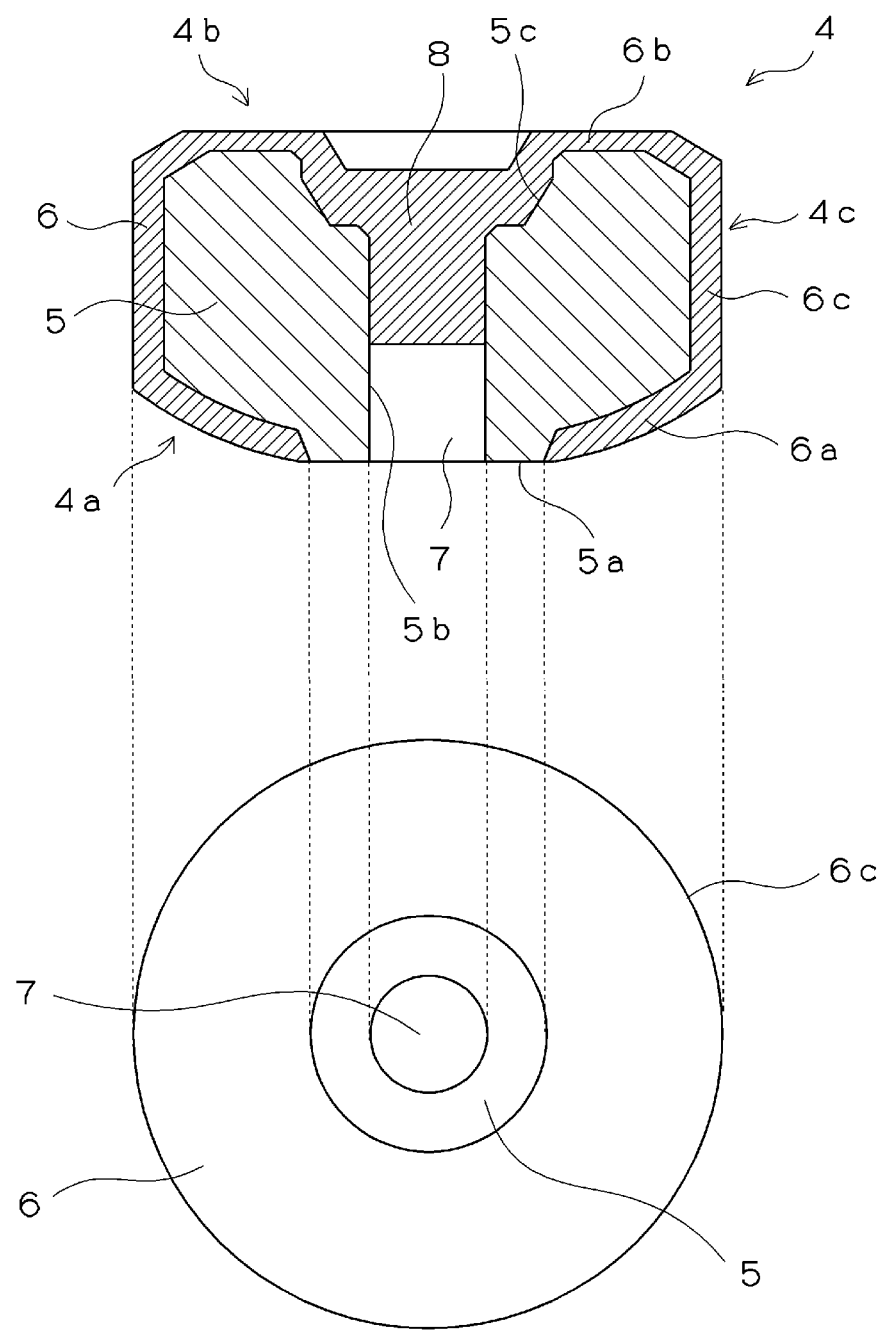
FIG. 2 is a vertical sectional view showing the semispherical shoe shown in FIG. 1 by enlarging it and a plan view thereof.

The construction of the semispherical shoe for the swash plate compressor to be obtained in the production method of the present invention is described in detail below with reference to FIG. 2. The upper illustration of FIG. 2 is a vertical sectional view showing one example of the semispherical shoe. The lower illustration of FIG. 2 is a plan view thereof. As shown in FIG. 2, the semispherical shoe 4 has an approximately semispherical construction composed of a spherical part 4a constituting a part of a sphere of the semispherical shoe, a planar part 4b having a form obtained by cutting the sphere almost planarly at a side opposite to the position of the spherical part 4a, and an outer peripheral part 4c connecting the spherical part 4a and the planar part 4b to each other. The semispherical shoe 4 is circular in its planar configuration. The surface of the outer peripheral part 4c (surface of resin layer 6c) is formed as a cylindrical outer peripheral surface. Regarding the entire configuration of the semispherical shoe 4, one of the bottom surfaces of a cylindrical body is shaped in a convex configuration constituting a part of a semisphere. The entire configuration of the semispherical shoe 4 is not limited to the above-described one, but may be shaped in any desired configuration so long as the semispherical shoe has the planar part to be subjected to the sliding contact with the swash plate and the spherical part to be subjected to the sliding contact with the piston. The semispherical shoe may have a configuration not having the above-described outer peripheral part (cylindrical part).

The semispherical shoe 4 has a base material 5 consisting of a hard material. By injection molding described later, a resin layer 6 is formed on the surface of the planar part 4b to be subjected to the sliding contact with the swash plate and on the surface of the spherical part 4a to be subjected to the sliding contact with the piston. A resin layer 6a is formed on the surface of the spherical part 4a. A resin layer 6b is formed on the surface of the planar part 4b. The resin layer 6c is formed on the surface of the outer peripheral part 4c. Each resin layer is formed thinly (0.1 to 0.7 mm). The base material 5 is shaped along the entire configuration of the semispherical shoe 4. The diameter of the semispherical shoe is 5 to 15 mm.

The planar part 4b of the semispherical shoe 4 to be subjected to the sliding contact with the swash plate and the spherical part 4a thereof to be subjected to the sliding contact with the piston are positioned at opposite sides in the axial direction of the semispherical shoe. By continuously and integrally forming the resin layers on the surface of the planar part and on the surface of the spherical part through the outer peripheral part 4c, it is structurally hard for the resin layer formed on the surface of the planar part and that formed on the surface of the spherical part to peel off the base material. It is preferable to set the thickness of the resin layer 6a of the spherical part 4a larger than that of the resin layer 6b of the planar part 4b. By setting the thickness of the resin layer of the spherical part larger than that of the resin layer of the planar part, the thinly formed resin layer of the planar part to be subjected to the sliding contact with the swash plate has a high load resistance. On the other hand, the thickly formed resin layer of the spherical part to be subjected to the sliding contact with the piston has a preferable comformability with the piston when the resin layer of the spherical part makes partial sliding contact with the piston and has an excellent wear resistance. Further a resin composition to form the resin layer is allowed to secure a high degree of melt flowability in an injection molding operation.

In the semispherical shoe having the form shown in FIG. 2, a cylindrical spatial hollow part 5b penetrating the side of the spherical part 4a and the side of the planar part 4b is formed along the central axis of the circular base material 5. A resin-filled portion 8 where the resin composition is filled and an empty portion 7 where the resin composition is not filled are formed in the hollow part 5b. A core pin is fitted on the empty portion 7 in a molding operation. The empty portion 7 is not filled with resin and thus the surface of the base material is exposed at the empty portion. By forming the empty portion 7 in the hollow part, frictional heat generated by the sliding contact between the semispherical shoe and the swash plate as well as the piston is transmitted to the base material and dissipated from the empty portion. Thereby it is possible to prevent the resin layer from melting and allow the resin layer to have excellent wear resistance and seizure resistance. The empty portion 7 functions as an oil pocket for retaining lubricating oil therein.

The semispherical shoe 4 having the form shown in FIG. 2 has an exposed surface 5a which does not contact the piston on an outer surface of the side of the spherical part 4a. At the exposed surface, the base material 5 is not covered with the resin layer 6 and is exposed outside. The exposed surface is formed by cutting a portion of the spherical part 4a along a plane parallel with the planar part 4b and is not subjected to the sliding contact with the piston. By forming the non-contact portion where the base material is exposed outside on the outer surface of the semispherical shoe 4 at the side of the spherical part 4a, frictional heat generated at the spherical part can be easily dissipated therefrom. As described later, a small diameter stepped portion is formed on a core pin of an injection molding die. The stepped surface of the small diameter stepped portion is butted against an end surface of the base material to axially place the base material in position. Thereby the exposed surface 5a corresponding to the stepped surface is formed on a core pin-fitted edge of the hollow part of the semispherical shoe 4a.

A raw material for the base material of the semispherical shoe is not specifically limited so long as the raw material is hard and excellent in the mechanical strength and thermal conductivity thereof. Examples of the raw material include metal materials such as copper, aluminum, aluminum alloys, copper, and copper alloys; and ceramics. Examples of a steel material include bearing steel (SUJ1-5 and the like), chromium-molybdenum steel, carbon steel for mechanical structure, mild steel, stainless steel, and high-speed steel. To reduce the degree of abrasive wear of these steel materials due to the sliding contact between the semispherical shoe and the piston, it is preferable to enhance the surface hardness thereof by subjecting these steel materials to treatment such as quenching treatment. Of these steel materials, it is preferable of use the bearing steel in terms of reliability.

As the raw material for the base material, it is also possible to adopt sintered metals such as iron-based, copper-iron-based, copper-based, and stainless steel-based metals. It is preferable to adopt a sintered metal containing iron as its main component and an iron-based sintered metal containing not more than 10 wt % of copper. By adopting the sintered metal as the raw material of the base material, it is possible to allow the surface of the spherical part to have excellent lubricating oil retention performance and improve the adhesiveness between the base material and the resin layer owing to an anchor effect caused by a concavo-convex configuration of the surface of the base material.

In a case where the base material of the semispherical shoe consists of a dense body such as a molten metal or ceramics, to enhance the adhesiveness of the base material to the resin layer, it is preferable to roughen the surface of the base material into a concavo-convex configuration by subjecting the surface thereof to physical surface treatment such as shot blast or machining working or the like before the resin layer is formed. It is also preferable to subject the surface of the base material to chemical surface treatment such as acidic solution treatment (sulfuric acid, nitric acid, hydrochloric acid or mixed solutions consisting of these acids and other solutions) and alkaline solution treatment (sodium hydroxide, potassium hydroxide or mixed solutions consisting of these hydroxides and other solutions) to form a fine concavo-convex configuration on the surface of the base material. The acidic solution treatment is preferable because it eliminates the need for masking treatment. The fine concavo-convex configuration varies according to the concentration of the acidic solution or the alkaline solution, a treating period time, the type of post-treatment, and the like. To enhance the adhesiveness of the base material to the resin layer owing to the anchor effect, it is preferable to form the fine concavo-convex configuration by dispose concave portions at intervals of several nanometers to several tens of nanometers. Because the fine concavo-convex configuration formed by the chemical surface treatment has a complicated porous three-dimensional structure, the fine concavo-convex configuration easily displays the anchor effect and thus allows the base material and the resin layer to firmly adhere to each other.

As a base resin of the resin composition which forms the resin layer, synthetic resins which can be injection molded and are excellent in lubrication property and heat resistance thereof are preferable. Examples of such synthetic resins include aromatic polyether ketone (PEK) resin, polyacetal (POM) resin, polyphenylene sulfide (PPS) resin, injection moldable polyimide resin, polyamideimide (PAI) resin, polyamide (PA) resin, and injection moldable fluororesin. It is possible to use these synthetic resins singly or as polymer alloys consisting of mixtures of not less than two kinds thereof. Of these synthetic resins, it is preferable to use the aromatic PEK resin. By using the aromatic PEK resin, the obtained semispherical shoe of the present invention is excellent in its heat resistance, oil resistance, chemical resistance, creep resistance, and frictional wear resistance and is thus very reliable.

Examples of the aromatic PEK resin which can be used in the present invention include polyether ether ketone (PEEK) resin, polyether ketone (PEK) resin, and polyetherketoneetherketoneketone (PEKEKK) resin. As commercially available PEEK resin which can be used in the present invention, VICTREX PEEK (90P, 150P, 380P, 450P, 90G, and 150G) produced by Victrex Inc., Keta Spire PEEK (KT-820P, KT-880P) produced by SOLVAY SPECIALTY POLYMERS JAPAN K.K., and VESTAKEEP (1000G, 2000G, 3000G, and 4000G) produced by Daicel-Evonik Ltd. are listed. As the PEK resin, VICTREX HT produced by Victrex Inc. is exemplified. As the PEKEKK resin, VICTREX ST produced by Victrex Inc. is exemplified.

It is preferable that the melt viscosity of the resin composition forming the resin layer is 50 to 200 Pa·s when the temperature of the resin is 380 degrees C. and the shear velocity thereof is 1000 $s^{-1}$. By setting the melt viscosity of the resin composition within this range, it is possible to smoothly form the thin resin layer on the surface of the base material of the semispherical shoe by the injection molding. By enabling the thin resin layer to be formed by the injection molding and eliminating post processing after the molding finishes, it is possible to easily produce the semispherical shoe and decrease the cost for producing it. To allow the synthetic resin containing the aromatic PEK resin as its main component to have the melt viscosity in the above-described range, it is preferable to adopt the aromatic PEK resin whose melt viscosity in the above-described condition is not more than 150 Pa·s.

It is preferable to form the resin composition containing the aromatic PEK resin to which solid lubricants such as polytetrafluoroethylene (PTFE) resin, graphite, molybdenum disulfide, and the like and fibrous reinforcing materials such as various whiskers, aramid fiber, carbon fiber, and the like are added. The fibrous reinforcing materials and the inorganic solid lubricants (graphite, molybdenum disulfide, and the like) have an effect of decreasing the molding shrinkage factor of the aromatic PEK resin and of reducing an internal stress of the resin layer in insert-molding the resin composition on the surface of the base material. The solid lubricant allows the resin layer to have a low friction even in a condition in which the lubricating oil is thin and is thus capable of preventing the resin layer from being subjected to seizure.

Means for mixing the above-described raw materials of the resin composition forming the resin layer with one another and kneading them are not specifically limited. A pellet of the resin composition to be molded can be obtained by dry-mixing only powder raw materials with one another by using a Henschel mixer, a ball mixer, a ribbon blender, a Redige mixer or an ultra Henschel mixer and thereafter by melt-kneading the raw materials with a melt extruder such as a twin-screw extruder. In an operation of adding a filler to the kneaded raw materials, a side feed method may be adopted when they are melt-kneaded by the twin-screw extruder or the like. The pellet is molded into the resin layer in production processes described later. After a molding operation finishes, the resin layer may be subjected to annealing treatment or the like to improve the property thereof.

Figure 3:
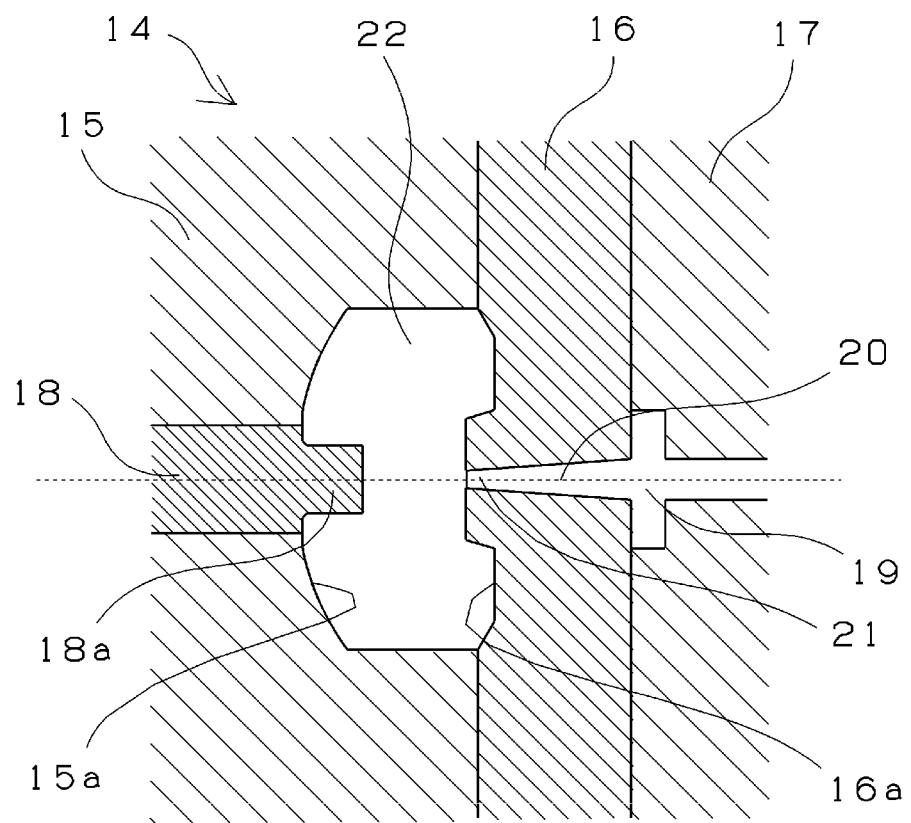
FIG. 3 is a vertical sectional view showing one example of an injection molding die of the present invention.

The method of the present invention for producing the semispherical shoe for the swash plate compressor is carried out to injection mold the resin composition on the surface of the base material of the semispherical shoe having the above-described construction. The injection molding die of the present invention for the semispherical shoe for the swash plate compressor is used in the above-described production method. The injection molding die is described in detail below with reference to FIG. 3. FIG. 3 is a sectional view showing one example of the injection molding die of the present invention. As shown in FIG. 3, an injection molding die 14 has a three-plate construction composed of a movable-side die plate 15, a fixed-side die plate 16, and a fixed side mounting plate 17. The fixed-side die plate 16 has a concave planar surface 16a for forming the planar part of the semispherical shoe. The movable-side die plate 15 has a concave spherical surface 15a for forming the spherical part of the semispherical shoe. The concave spherical surfaces 15a and 16a constitute a part of a cavity 22. A core pin 18 is mounted on the movable-side die plate 15 by disposing the core pin along a horizontal central axis of the cavity 22. The core pin 18 has a small diameter stepped portion 18a at its front end and thus has a small diameter stepped configuration. In communication with a runner 19 and a sprue 20, a gate 21 is disposed on the fixed-side die plate 16 to fill molten resin into the cavity 22. The gate 21 is disposed coaxially with the core pin 18. The cavity 22 may be so constructed that the fixed-side die plate has the concave spherical surface for forming the spherical part of the semispherical shoe and that the movable-side die plate has a concave spherical surface for forming the planar part of the semispherical shoe. In this case too, on the movable-side die plate 15, the core pin having the small diameter stepped configuration is disposed on the horizontal central axis of the cavity, while on the fixed-side die plate, the gate is disposed coaxially with the core pin.

In the production method of the present invention, the disposition of each of the core pin and the gate (sprue and runner are included) is not limited to the form shown in FIG. 3.

Figure 4:
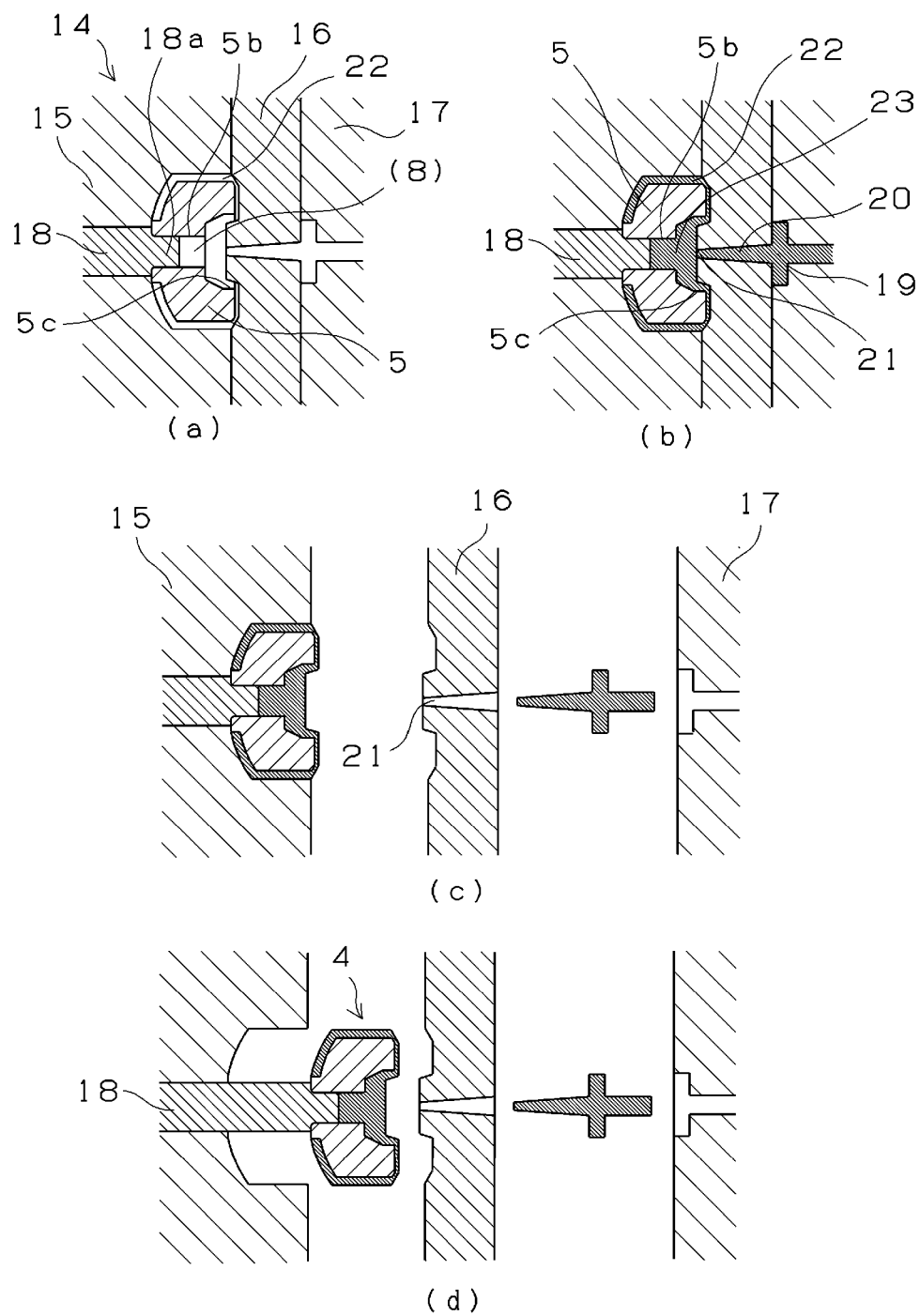
FIG. 4 shows processes of producing the semispherical shoe of the present invention.

As one example of the production method of the present invention, the processes of producing the semispherical shoe to be performed by using the injection molding die shown in FIG. 3 is described below with reference to FIG. 4. FIGS. 4(*a*) through 4(*d*) show the processes for producing the semispherical shoe by using the die. As shown in FIG. 4(*a*), before an injection molding operation is performed, the base material 5 is disposed inside the cavity 22. More specifically, the small diameter stepped portion 18a formed at the front end of the core pin 18 is fitted on the hollow part 5b of the base material 5. The hollow part 5b of the base material 5 is a cylindrical spatial portion. The small diameter stepped portion 18a of the core pin 18 is a columnar portion which fits on the hollow part of the base material. Thereby the base material 5 is horizontally and axially placed in position inside the cavity 22. By utilizing the fitting between the core pin and the hollow part of the base material, it is possible to easily and accurately place the base material in position inside the cavity and form the resin layer thinly on the surface of the base material with ease and high accuracy. A portion of the hollow part 5b of the base material 5 on which the small diameter stepped portion 18a fits is formed as the empty portion 7 when the production of the semispherical shoe is completed. A portion of the hollow part of the base material on which the small diameter stepped portion 18*a* does not fit is formed as the resin-filled portion 8 when the production of the semispherical shoe is completed (see FIG. 2). A surface (contact surface of base material in its axial direction) of the base material 5 against which the stepped surface of the small diameter stepped portion 18*a* is butted is formed as the exposed surface 5*a* where the resin layer 6 is not formed when the production of the semispherical shoe is completed (see FIG. 2). Before the injection molding operation is performed, the injection molding die 14 having the three-plate construction composed of the fixed side mounting plate 17, the fixed-side die plate 16, and the movable-side die plate 15 is closed by keeping its temperature at a predetermined temperature of resin to be used.

As shown in FIG. 4(*b*), molten resin 23 consisting of the resin composition heated to a molten state is injected into the die by a set injection pressure and passes through the runner 19 and the sprue 20 and filled into the cavity 22 via the gate 21. Thereafter the molten resin 23 undergoes a pressure holding process and a cooling process for a predetermined period of time in a state where the die is kept closed. The gate 21 of the fixed-side die plate 16 is disposed coaxially with the core pin 18 of the movable-side die plate 15 (disposed along the horizontal central axis of the cavity 22). A gate opening is disposed at a portion, of the cavity 22, which is to be formed as the resin-filled portion 8 when the production of the semispherical shoe is completed. In the process shown in FIG. 4(*b*), with the base material being disposed inside the cavity 22, the molten resin 23 is injected and filled into the portion to be formed as the resin-filled portion disposed along the central axis of the base material 5 (insert molding).

The molten resin injected from the gate 21 collides with the front end of the core pin 18 (front end of the small diameter stepped portion 18*a*) and thereafter flows from the central axis of the semispherical shoe to the surface of the base material with the molten resin uniformly coating the surface thereof. Consequently it is possible to integrally and uniformly form each resin layer covering the periphery of the base material without generating welds. Thus it is possible to prevent the strength of the resin layer from partially deteriorating, the sliding contact property thereof from becoming nonuniform, and the strength of adhesion thereof to the base material from becoming nonuniform. Thereby it is possible to prevent the resin layer from cracking or peeling off the base material due to the sliding contact between the resin layer and the swash plate as well as the piston. In a case where the hollow part 5*b* of the base material 5 has a configuration not axially penetrating the base material 5, the molten resin injected from the gate 21 collides with a bottom portion of the hollow part 5*b* and uniformly coats the surface of the base material similarly to the case where the hollow part penetrates the base material.

A portion, of the hollow part 5*b* of the base material 5, which is formed as the resin-filled portion and on which the core pin 18 does not fit plays the role of a cold slug well and is thus capable of preventing cold slug from being generated in the resin layer. By setting the length of the resin-filled portion within a range covering ¼ to ¾ of the axial length of the hollow part 5*b*, the above-described effect is easily obtainable. By setting the length of the resin-filled portion within the above-described range, it is possible to allow a fitting portion between the base material 5 and the core pin 18 to have a sufficiently long fitting length.

In the form shown in FIG. 4 (*b*), a large diameter hollow portion 5*c* having a diameter larger than those of other portions of the hollow part 5*b* of the base material 5 is formed at an end of a resin-filled portion side of the hollow part. The diameter of the large diameter hollow portion 5*c* is 1.5 to 3 times larger than those of the other portions of the hollow part 5*b*. By forming the large diameter hollow portion 5*c*, it is possible to set the diameter of the gate large and allow the flowability of the molten resin injected from the gate to be easily secured. Therefore although the resin layer is thinly formed, it is possible to prevent defects such as a short shot from occurring in the injection molding and uniformly form the resin layer having a high strength in its adhesiveness to the surface of the base material.

In the form shown in FIG. 4(*b*), the gate 21 is positioned at the planar part side of the semispherical shoe. Thereby the molten resin flows from the planar part side to the spherical part side. Considering that the highest load is applied to the planar part, the resin layer is formed on the planar part thinly enough to withstand a high surface pressure. Because the gate 21 is a pin point gate, gate cut (in-mold gate cut) can be accomplished in an injection molding process. Thus in an operation of manually cutting the gate, there is no fear that the surface of the semispherical shoe which is a precision part is damaged.

Because the gate opening is disposed at a position recessed from the sliding contact surface of the semispherical shoe, it is possible to prevent a gate mark from projecting from the sliding contact surface (surface of resin layer) thereof. By forming the gate 21 at the above-described recessed position at which the distance between the surface of the base material and the position of the gate is larger than the thickness of the resin layer, it is possible to prevent the gate mark from projecting from the sliding contact surface of the semispherical shoe more reliably.

As shown in FIG. 4(*c*), by opening the injection molding die after the cooling process finishes, the fixed-side die plate 16 is released from the fixed side mounting plate 17, and at the same time, the movable-side die plate 15 is released from the fixed-side die plate 16. Thereby the runner and the like disengage from the die and drop. When the movable-side die plate 15 is released from the fixed-side die plate 16, the resin which has remained at the gate 21 is fractured, and the gate is cut.

As shown in FIG. 4(*d*), by advancing the core pin 18 as an ejection pin, the semispherical shoe 4 is taken out from the inside of the cavity. By so constructing the injection molding die that the core pin 18 is used as the ejection pin advanceable after the molding die is opened, it is unnecessary for proving the molding die with the ejection pin separately and in addition, the mark of the ejection pin does not remain on the resin layer of the semispherical shoe. The "advance" herein means an operation of advancing a molded product in a direction in which the molded product is ejected outside the cavity.

After the resin layer is formed in the above-described processes, the surface of the resin layer to be subjected to the sliding contact with the swash plate or the piston may be subjected to abrasive machining. By subjecting the surface of the resin layer to the abrasive machining, it is possible to eliminate a variation in the height thereof and thus improve the dimensional accuracy thereof. It is favorable to adjust the roughness of the surface of the resin layer to 0.05 to 1.0 μmRa (JIS B0601). By setting the roughness of the surface of the resin layer within the above-described range, the true contact area of the sliding contact surface thereof to be subjected to the sliding contact with the swash plate or the piston becomes large. Thereby it is possible to lower the actual surface pressure to be applied to the sliding contact surface of the resin layer and thus prevent the sliding contact surface thereof from being subjected to seizure. In a case where the roughness of the surface of the resin layer is less than 0.05 μmRa, the supply of the lubricating oil to the sliding contact surface thereof is insufficient. In a case where the roughness of the sliding contact surface thereof exceeds 1.0 μmRa, the true contact area of the sliding contact surface thereof decreases. As a result, a high pressure is applied locally to the sliding contact surface thereof and thus there is a fear that the sliding contact surface thereof may be subjected to seizure. It is more favorable to set the roughness of the sliding contact surface thereof to 0.1 to 0.5 μmRa.

To compensate a lubricating action when the lubricating oil is dilute, an oil pocket or a dynamic pressure groove may be formed on the sliding contact surface of the resin layer to be subjected to the sliding contact surface with the swash plate or the piston in addition to the above-described hollow part. As the form of the oil pocket, speckled or streaky concave portions are exemplified. As the speckled or streaky configuration, parallel straight lines, lattice-shaped, spiral, radial, and annular configurations are exemplified. The depth of the oil pocket can be appropriately determined in a range less than the thickness of the resin layer.

The swash plate compressor for which the semispherical shoe to be obtained by carrying out the production method of the present invention is used is so constructed that inside the housing where the refrigerant is present, the rotational motion of the swash plate mounted perpendicularly and obliquely on the rotational shaft by directly fixing the swash plate to rotational shaft or indirectly fixing the swash plate thereto through the coupling member is converted into the reciprocating motion of the piston through the semispherical shoe to be subjected to sliding contact with the swash plate to compress and expand the refrigerant. By using the semispherical shoe obtained by carrying out the production method of the present invention for the swash plate compressor, it is possible to eliminate the need for forming a lubricating film on the surface of the swash plate and that of the piston both of which are subjected to the sliding contact with the semispherical shoe. That is, the swash plate and the piston can be incorporated in the swash plate compressor and can be subjected to the sliding contact with the semispherical shoe without forming the lubricating film on the polished surface of the base material of each of the swash plate and the piston. Thus by adopting the above-described semispherical shoe, the present invention is capable of providing the swash plate compressor having the function equivalent to that of conventional ones at a lower price than conventional ones.

INDUSTRIAL APPLICABILITY

The method of the present invention for producing the semispherical shoe for the swash plate compressor is capable of producing the durable semispherical shoe which can be prevented from being subjected to seizure even in a dry lubrication state in which there is no lubricating oil at a start time of an operation of the swash plate compressor, can be restrained from deteriorating in its lubricating property due to generated frictional heat, and can be restrained from deteriorating in its strength at a production time. Therefore the production method of the present invention can be utilized to produce semispherical shoes for various swash plate compressors. The production method of the present invention can be also suitably utilized to produce semispherical shoes for recent swash plate compressors in which carbon dioxide or HFC1234yf is used as the refrigerant and which are operated in high-speed and high-load conditions (for example, surface pressure exceeds 8 MPa).

EXPLANATION OF REFERENCE NUMERALS AND SYMBOLS

1: housing
2: rotational shaft
3: swash plate
4: semispherical shoe
5: base material
6: resin layer
7: empty portion
8: resin-filled portion
9: piston
10: cylinder bore
11: needle roller bearing
12: thrust needle roller bearing
13: spherical seat
14: injection molding die
15: movable-side die plate
16: fixed-side die plate
17: fixed side mounting plate
18: core pin
19: runner
20: sprue
21: gate
22: cavity
23: molten resin

The invention claimed is:

1. A method for producing a semispherical shoe for a swash plate compressor so constructed that inside a housing where a refrigerant is present, a rotational motion of a swash plate mounted perpendicularly and obliquely on a rotational shaft by directly fixing said swash plate to said rotational shaft or indirectly fixing said swash plate thereto through a coupling member is converted into a reciprocating motion of a piston through a semispherical shoe to be subjected to sliding contact with said swash plate to compress and expand said refrigerant, wherein said semispherical shoe comprises a base material, consisting of a hard material, which has a hollow part along a central axis thereof and a resin layer, consisting of a resin composition, which is formed on a surface of a planar part, disposed on a periphery of said base member, which is to be subjected to sliding contact with said swash plate and on a surface of a spherical part, disposed on said periphery thereof, which is to be subjected to sliding contact with said piston;

said hard material is a metal or a ceramic; and a resin-filled portion where said resin composition is filled and an empty portion where said resin composition is not filled are formed in said hollow part of said base material, said method comprising:

forming said resin-filled portion and said resin layer by insert molding comprising injecting and filling said resin composition into a portion to be formed as said resin-filled portion with said base material being disposed inside a cavity of a molding die wherein said molding die comprises a movable-side die plate and a fixed-side die plate, wherein one of said movable-side die plate and said fixed-side die plate has a concave spherical surface, for forming said spherical part, which constitutes a part of said cavity and a core pin, said core pin being disposed on a horizontal central axis of said cavity, which fits on said hollow part of said base material; and an other of said movable-side die plate and said fixed-side die plate having a void region with a planar surface, for forming said planar part, which constitutes a part of said cavity, and a gate, for injecting and filling said resin composition into said molding die, which is disposed coaxially with said core pin, and wherein an opening of said gate is disposed at a position recessed from a sliding contact surface of said semispherical shoe.

2. A method for producing a semispherical shoe for a swash plate compressor according to claim 1, wherein said hollow part of said base material is cylindrical; and a large diameter hollow portion having a diameter larger than those of other portions of said hollow part is formed at an end of a resin-filled portion side of said hollow part.

3. A method for producing a semispherical shoe for a swash plate compressor according to claim 1, wherein said gate is a pin point gate.

4. A method for producing a semispherical shoe for a swash plate compressor according to claim 1, wherein a length of said resin-filled portion is ¼ to ¾ of an axial length of said hollow part.

5. A method according to claim 1, wherein a stepped surface of a stepped portion of reduced diameter relative to the core pin body formed at a front end of said core pin butts against an end surface of said base material with said core pin fitting on said hollow part of said base material.

6. A method according to claim 1, wherein said movable-side die plate has said core pin capable of advancing as an ejection pin after said molding die is opened.

* * * * *